(12) United States Patent
Han (10) Patent No.: US 11,353,876 B2
(45) Date of Patent: Jun. 7, 2022

(54) AUTOMATIC CONVEYOR UNIT, MOTION CONTROL METHOD AND APPARATUS THEREFOR, AND AUTOMATIC SORTING SYSTEM

(71) Applicant: BEIJING GEEKPLUS TECHNOLOGY CO., LTD., Beijing (CN)

(72) Inventor: Hao Han, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 184 days.

(21) Appl. No.: 16/487,351

(22) PCT Filed: Dec. 12, 2017

(86) PCT No.: PCT/CN2017/115750
§ 371 (c)(1),
(2) Date: Aug. 20, 2019

(87) PCT Pub. No.: WO2019/061844
PCT Pub. Date: Apr. 4, 2019

(65) Prior Publication Data
US 2020/0233421 A1 Jul. 23, 2020

(30) Foreign Application Priority Data
Sep. 30, 2017 (CN) .......................... 201710945826.9

(51) Int. Cl.
*G05D 1/02* (2020.01)

(52) U.S. Cl.
CPC ......... *G05D 1/0214* (2013.01); *G05D 1/0212* (2013.01); *G05D 1/0223* (2013.01);
(Continued)

(58) Field of Classification Search
CPC ......... G05D 1/0214; G05D 2201/0216; G05D 1/0274; G05D 1/0212; G05D 1/0225; G05D 1/0223
See application file for complete search history.

(56) References Cited

U.S. PATENT DOCUMENTS

| | | | | |
|---|---|---|---|---|
| 10,093,526 B2 * | 10/2018 | D'Andrea | ............... | B66F 9/063 |
| 2011/0130654 A1 | 6/2011 | D'Andrea et al. | | |
| 2019/0079537 A1 * | 3/2019 | Yoshida | ............... | G05D 1/0274 |

FOREIGN PATENT DOCUMENTS

| | | |
|---|---|---|
| CN | 106020197 A | 10/2016 |
| CN | 106020200 A | 10/2016 |

(Continued)

OTHER PUBLICATIONS

International Search Report for PCT/CN2017/115750 dated Jun. 26, 2018 with English Translation.
(Continued)

*Primary Examiner* — Rodney A Butler
(74) *Attorney, Agent, or Firm* — Arentfox Schiff LLP (57) ABSTRACT

A motion control method and apparatus, an automatic conveyor unit, and an automatic sorting system are provided. The method includes: determining that the automatic conveying unit is to make a turn; configuring a second basic unit in front of a first basic unit where the automatic conveying unit is located to be a basic unit for making the turn; and controlling the automatic conveying unit to move in an arc centered on a predetermined point.

16 Claims, 5 Drawing Sheets

(52) U.S. Cl.
CPC ......... *G05D 1/0225* (2013.01); *G05D 1/0274* (2013.01); *G05D 2201/0216* (2013.01)

(56) References Cited

FOREIGN PATENT DOCUMENTS

| | | |
|---|---|---|
| CN | 106314129 A | 1/2017 |
| CN | 205880660 U | 1/2017 |
| CN | 106679669 A | 5/2017 |
| CN | 207249487 U | 4/2018 |
| EP | 0638471 A1 | 2/1995 |
| JP | S61103708 U | 7/1986 |
| JP | H01 195512 A | 8/1989 |
| JP | H02115906 A | 4/1990 |
| JP | H03192407 A | 8/1991 |
| JP | 0830329 A | 2/1996 |
| JP | H1195512 A | 4/1999 |
| JP | H11259130 A | 9/1999 |
| JP | 2002108446 A | 4/2002 |
| JP | 2004-512623 * | 7/2004 |
| JP | 2005071128 A | 3/2005 |
| JP | 2009541177 A | 11/2009 |
| JP | 2011215720 A | 10/2011 |
| JP | 2014098948 A | 5/2014 |
| JP | 2016047744 A | 4/2016 |
| KR | 10-0151142 | 6/1998 |
| WO | 2007149711 A2 | 12/2007 |

OTHER PUBLICATIONS

First Written Opinion received in corresponding Singapore Patent Application No. 11202002805V dated Oct. 19, 2020.
Examination Report No. 1 received in corresponding Australian Patent Application No. 2017434613 dated Oct. 14, 2020.

\* cited by examiner

AUTOMATIC CONVEYOR UNIT, MOTION CONTROL METHOD AND APPARATUS THEREFOR, AND AUTOMATIC SORTING SYSTEM

CROSS-REFERENCE TO RELATED APPLICATIONS

The application is a US national phase application of international patent application No. PCT/CN2017/115750 filed on Dec. 12, 2017, which claims priority to Chinese patent application No. 201710945826.9 filed on Sep. 30, 2017, the disclosures of which are incorporated herein by reference in their entireties.

TECHNICAL FIELD

The present application generally relates to the field of automatic navigation and, in particular, to a motion control method and apparatus for an automatic conveying unit, the automatic conveying unit adopting this method and/or apparatus, and an automatic sorting system.

BACKGROUND

The parcel sorting robot system is a logistics sorting system created according to national conditions and geographical factors of our country and in overall consideration of a balance between labor cost in labor-intensive industries and costs of precise and complex automation equipment in our country. With the instant response feature of robots and the flexibility of the distributed system, the parcel sorting robot system can significantly reduce the overall costs of parcel sorting.

In most of the existing parcel sorting robot systems, a field is divided into square cells during operation so that a grid coordinate system composed of these square cells is created in the field. After receiving a motion task, a robot acquires the starting point and the ending point and travels in the grid according to the route planned by the system. A route planned by the system is a route formed by connection of a number of cells. A robot, starting from any cell, can merely reach four adjacent cells and cannot directly reach its four diagonal cells.

When a robot is to travel at a turn in a planned route, the robot needs to decelerate, stop, then rotate in situ, and finally accelerate and leave the turn. In this process, if a second robot is expected to pass this turn after the preceding robot, the second robot has to stop and wait. Thus, as the number of turns planned by the system increases, the average running speed of the robot decreases due to multiple accelerations and decelerations. Furthermore, deceleration of one robot may have a chain effect, which in turn causes deceleration of other robots.

Thus, to improve the system efficiency, in addition to minimizing the number of turns in a planned route, a motion control mechanism capable of achieving improved turning control is also required.

SUMMARY

With respect to the preceding drawbacks and deficiencies in the existing art, provided are a new improved motion control method and apparatus enabling an automatic conveying unit to make a turn in an arc instead of in situ, the automatic conveying unit using this method and/or apparatus, and an automatic sorting system.

According to an aspect of the present application, a motion control method for an automatic conveying unit that moves within a field including a plurality of basic units is provided. The method includes determining that the automatic conveying unit is to make a turn; configuring a second basic unit in front of a first basic unit where the automatic conveying unit is located to be a basic unit for making the turn; and controlling the automatic conveying unit to move along an arc centered on a predetermined point so that the automatic conveying unit completes the turn when moving through the second basic unit to a third basic unit adjacent to the second basic unit in the direction of the turn.

In the motion control method, the predetermined point is an intersection of the first basic unit, the second basic unit and the third basic unit; a radius of the arc is one-half of a side length of the basic unit; and the automatic conveying unit starts to move along an arc when moving to a boundary between the first basic unit and the second basic unit.

In the motion control method, the predetermined point is a center point of a fourth basic unit adjacent to the first basic unit in the direction of the turn; a radius of the arc is a side length of a basic unit; and the automatic conveying unit starts to move along an arc when moving to a center point of the first basic unit.

In the motion control method, determining that the automatic conveying unit is to make a turn includes determining that the automatic conveying unit is to make a continuous turn including a plurality of turns; configuring the basic unit for making the turn of the automatic conveying unit includes configuring a plurality of basic units in the direction of the continuous turn of the automatic conveying unit to be basic units for making the turn; and controlling the automatic conveying unit to move along an arc centered on the predetermined point so that the automatic conveying unit completes the continuous turn by passing through the plurality of basic units.

In the motion control method, before configuring the second basic unit to be the basic unit for making the turn, the method further includes determining whether the second basic unit has been requested by other automatic conveying units; and in response to determining that the second basic unit is not requested by the other automatic conveying unit, forbidding the other automatic conveying unit from entering the second basic unit.

In the motion control method, before configuring the second basic unit to be the basic unit for making the turn, the method further includes determining whether the second basic unit and the fourth basic unit have been requested by other automatic conveying units; and in response to determining that the second basic unit and the fourth basic unit are not requested by the other automatic conveying unit, forbidding the other automatic conveying unit from entering the second basic unit and the fourth basic unit.

In the motion control method, the field includes a high-speed motion region and a low-speed motion region; and determining that the automatic conveying unit is to make a turn includes determining whether the automatic conveying unit is to enter the low-speed motion region from the high-speed motion region; and in response to determining that the automatic conveying unit is to enter the low-speed motion region from the high-speed motion region, determining that the automatic conveying unit is about to make a turn.

In the motion control method, the low-speed motion region is a delivery channel for dropping of a to-be-sorted item in an automatic sorting system.

According to another aspect of the present application, a motion control apparatus for an automatic conveying unit that moves within a field including a plurality of basic units is provided. The apparatus includes a turn determination unit, which is configured to determine that the automatic conveying unit is to make a turn; a turn configuration unit, which is configured to configure a second basic unit in front of a first basic unit where the automatic conveying unit is located to be a basic unit for making the turn; and a motion control unit, which is configured to control the automatic conveying unit to move along an arc centered on a predetermined point so that the automatic conveying unit completes the turn when moving through the second basic unit to a third basic unit adjacent to the second basic unit in the direction of the turn.

In the motion control apparatus, the predetermined point is an intersection of the first basic unit, the second basic unit and the third basic unit; a radius of the arc is one-half of a side length of a basic unit; and the motion control unit is configured to control the automatic conveying unit to start to move along an arc when the automatic conveying unit moves to a boundary between the first basic unit and the second basic unit.

In the motion control apparatus, the predetermined point is a center point of a fourth basic unit adjacent to the first basic unit in the direction of the turn; a radius of the arc is a side length of a basic unit; and the motion control unit is configured to control the automatic conveying unit to start to move along an arc when the automatic conveying unit moves to a center point of the first basic unit.

In the motion control apparatus, the turn determination unit is further configured to determine that the automatic conveying unit is to make a continuous turn comprising a plurality of turns; the turn configuration unit is further configured to configure a plurality of basic units in the direction of the continuous turn of the automatic conveying unit to be basic units for making the turn; and the motion control unit is configured to control the automatic conveying unit to move along an arc centered on the predetermined point so that the automatic conveying unit completes the continuous turn by passing through the plurality of basic units.

In the motion control apparatus, the turn configuration unit is further configured to determine whether the second basic unit has been requested by other automatic conveying units; and in response to determining that the second basic unit is not requested by the other automatic conveying unit, forbid the other automatic conveying unit from entering the second basic unit.

In the motion control apparatus, the turn configuration unit is further configured to determine whether the second basic unit and the fourth basic unit have been requested by other automatic conveying units; and in response to determining that the second basic unit and the fourth basic unit are not requested by the other automatic conveying unit, forbid the other automatic conveying unit from entering the second basic unit and the fourth basic unit.

In the motion control apparatus, the field includes a high-speed motion region and a low-speed motion region; and the turn determination unit is configured to determine whether the automatic conveying unit is to enter the low-speed motion region from the high-speed motion region; and in response to determining that the automatic conveying unit is to enter the low-speed motion region from the high-speed motion region, determine that the automatic conveying unit is to make a turn.

In the motion control apparatus, the low-speed motion region is a delivery channel for dropping of a to-be-sorted item in an automatic sorting system.

According to another aspect of the present application, an automatic conveying unit configured to move within a field including a plurality of basic units is provided. The automatic conveying unit includes the preceding motion control apparatus.

According to another aspect of the present application, an automatic sorting system is provided. The automatic sorting system includes an automatic conveying unit, which is configured to convey a to-be-sorted item; a sorting region, in which the automatic conveying unit operates to sort the to-be-sorted item; and a control system, which is configured to control sorting of the to-be-sorted item and to control the automatic conveying unit to move in the sorting region. The control system further includes the preceding motion control apparatus.

A motion control method and apparatus for an automatic conveying unit, the automatic conveying unit adopting this method and/or apparatus, and an automatic sorting system provided in the present application enable the automatic conveying unit to make a turn in an arc instead of in situ, thereby improving the motion efficiency of the automatic conveying unit.

DETAILED DESCRIPTION

The following description is provided to disclose the present application to enable those skilled in the art to implement the present application. The preferred embodiments in the following description are illustrated by way of example, and other apparent variations will occur to those skilled in the art. The basic principles of the present application which are defined in the following description may be applied to other embodiments, modifications, improvements, equivalents and other solutions not departing from the spirit and the scope of the present application.

The terms and words used in the following description and claims are not limited to literal meanings, but are used merely by the applicant to providing a clear and consistent understanding of the present application. Accordingly, it will be apparent to those skilled in the art that the following description of the various embodiments of the present application is provided solely for the purpose of illustration and not for the purpose of limiting the present application as defined by the appended claims and their equivalents.

It is to be understood that the term "one" should be construed as "at least one" or "one or more". That is, in one embodiment, the number of elements may be one, and in other embodiments, the number of the elements may be more than one. The term "one" should not be construed as limiting the number of the elements.

Ordinal numbers like "first" and "second" are used to describe various components and not to limit the components. These terms are used merely to distinguish one component from another. For example, the first component may be referred to as the second component and, likewise, the second component may also be referred to as the first component, without departing from the teachings of the inventive concept. The term "and/or" used herein includes any and all combinations of one or more associated listed items.

The terms used herein are intended only to describe various embodiments and not to limit the embodiments. As used herein, a singular form is intended to include a plural form unless otherwise clearly instructed in the context. In addition, it is to be understood that the term "include" and/or "have" used in the specification is intended to specify the presence of the feature, quantity, step, operation, component, element or combinations thereof and not to exclude the presence or addition of one or more other features, quantities, steps, operations, components, elements or combinations thereof.

The terms used herein, including technical and scientific terms, have the same meanings as those commonly understood by those skilled in the art as long as the terms are not defined differently. It is to be understood that terms defined in a commonly used dictionary have meanings consistent with the meanings of the terms in the existing art.

The present application will be further described in detail in conjunction with the accompanying drawings and implementation modes.

Overview of a Motion Control Method

As described above, in most of the existing parcel sorting robot systems, a field is divided into square cells during operation so that a grid coordinate system composed of these square cells is created in the field. After receiving a motion task, a robot travels in the grid according to the grid coordinate system and according to the route planned by the system. Thus, for such a parcel sorting robot system, the robot cannot move along all directions, but can only move along a fixed direction.

A route planned by the system is a route formed by connection of a number of cells. A robot, starting from any cell, can merely reach four adjacent cells and cannot directly reach its four diagonal cells. When a robot is to travel at a turn of a planned route, the robot needs to decelerate, stop, then rotate in situ, and finally accelerate and leave the turn. Thus, in such a system, the motion mode of a robot includes only "move forward" and "turn in situ".

However, in this process, if a second robot is expected to pass this turn after the preceding robot, the second robot has to stop and wait. Thus, as the number of turns planned by the system increases, the average running speed of the robot decreases due to multiple accelerations and decelerations. Furthermore, deceleration of one robot may have a chain effect, which in turn causes deceleration of other robots.

With respect to the preceding problem, a motion control method for an automatic conveying unit that moves within a field including a plurality of basic units is provided in embodiments of the present application. The method includes: determining that the automatic conveying unit is to make a turn; configuring a second basic unit in front of a first basic unit where the automatic conveying unit is located to be a basic unit for making the turn; and controlling the automatic conveying unit to move along an arc centered on a predetermined point so that the automatic conveying unit completes the turn when moving through the second basic unit to a third basic unit adjacent to the second basic unit in the direction of the turn.

Figure 1:
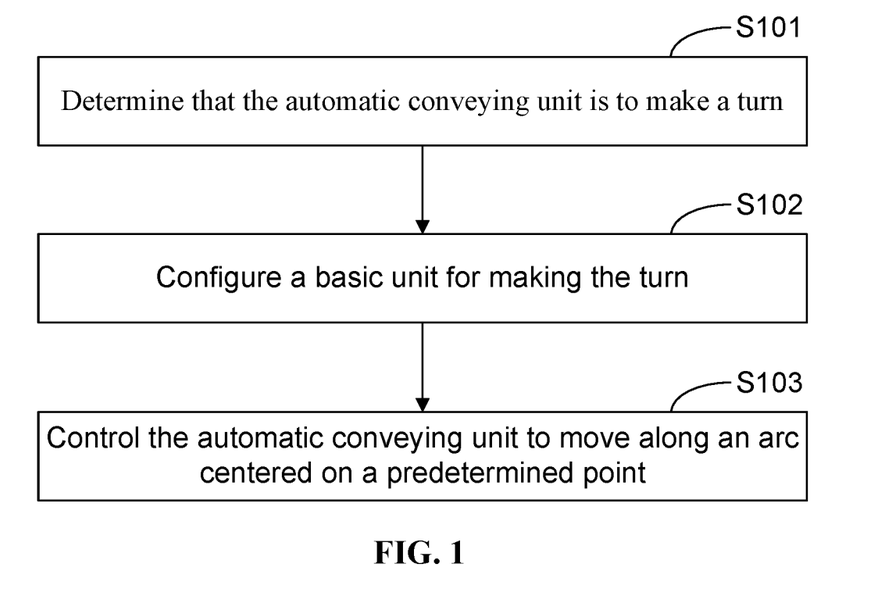
FIG. 1 is a schematic flowchart of a motion control method according to embodiments of the present application.

FIG. 1 is a schematic flowchart of a motion control method according to embodiments of the present application. As shown in FIG. 1 and FIGS. 2-4, the motion control method according to embodiments of the present application includes steps S101, S102 and S103. In S101, it is determined that the automatic conveying unit is to make a turn. In S102, a second basic unit (namely, a second unit gird 12) in front of a first basic unit (namely, a first unit gird 11) where the automatic conveying unit is located is configured to be a basic unit for making the turn. In S103, the automatic conveying unit is controlled to move along an arc 15 centered on a predetermined point 16 so that the automatic conveying unit completes the turn when moving through the second basic unit to a third basic unit (namely, a third unit gird 13) adjacent to the second basic unit in the direction of the turn.

Thus, in the motion control method according to embodiments of the present application, after it is determined that the automatic conveying unit needs to make a turn, first, the second basic unit in front of the first basic unit where the automatic conveying unit is located in the current motion direction of the automatic conveying unit is configured to be a basic unit for making a turn, and then, the automatic conveying unit is controlled to move along an arc while passing through the second basic unit so as to make a turn. In this way, the automatic conveying unit completes the turn when moving in this arc to a third basic unit adjacent to the second basic unit in the direction of the turn.

For example, when the automatic conveying unit needs to make a right turn while moving forwards, the second basic unit in front of the first basic unit where the automatic conveying unit is located at this time is configured to be a basic unit for making a turn, and the automatic conveying unit is controlled to make a right turn in an arc. In this way, when the automatic conveying unit reaches the third basic unit on the right of the second basic unit after passing through the second basic unit, the robot has completed the right turn and has been in the state of facing the right.

In the motion control method according to embodiments of the present application, a turn in an arc instead of in situ is achieved, thereby, on the one hand, preventing the automatic conveying unit from affecting the passage of other automatic conveying units and thus preventing congestion and, on the other hand, saving the time taken by the automatic conveying unit to make a turn because the automatic conveying unit does not need to decelerate until it comes to a standstill and then rotates in situ.

That is, limited by scenarios to which the motion control method according to embodiments of the present application is applicable, the automatic conveying unit moving in this field cannot move arbitrarily and the preplanned motion route of the automatic conveying unit is designed in units of basic units. Since the automatic conveying unit cannot avoid other automatic conveying units in the route by making a turn in any manner or by moving in any direction, a motion control method as specially designed in embodiments of the present application is required to improve the overall passage efficiency of the automatic conveying unit in the field.

It is to be understood by those skilled in the art that the automatic conveying unit may be a robot in the preceding robot parcel sorting system or another movable unit. What are conveyed by the automatic conveying unit in the field may be parcels in a logistics system or may be other items that need to be conveyed, for example, to-be-sorted items in an automatic sorting system.

The following describes several turning modes in the motion control method according to embodiments of the present application.

Figure 2:
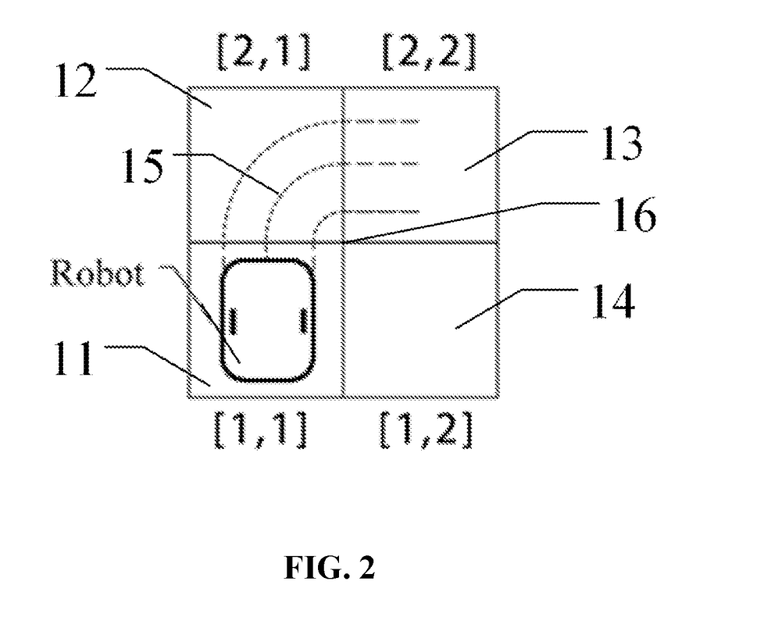
FIG. 2 is a schematic diagram illustrating an example of a turn according to embodiments of the present application.

FIG. 2 is a schematic diagram illustrating an example of a turn according to embodiments of the present application. As shown in FIG. 2, the automatic conveying unit makes a 90° turn in an arc during motion to pass through the curved route within one cell. When the automatic conveying unit needs to rotate 90° in the route planned for the automatic conveying unit by the system, the automatic conveying unit moves from the cell [1, 1] to the cell [2, 2] via the cell [2, 1] as shown in FIG. 2. The automatic conveying unit first moves to the boundary between the drive wheel connecting shaft and the cell in the current motion direction and then uses the differential for the left and right wheels to move along an arc centered on the intersection of the four cells and with a radius of one-half of the side length of one cell. After rotating 90°, the drive wheel connecting shaft of the automatic conveying unit is located at and coincides with the boundary between the cell [2, 1] and the cell [2, 2]. Then the automatic conveying unit continues to move straight to the center of the cell [2, 2] to complete the turn.

In this turning method, in condition that a specific cell size is satisfied, the turning of the automatic conveying unit involves merely cells in the predicted route and does not occupy such cells outside the predicted route as the cell [1, 2] in FIG. 2.

That is, in the motion control method, the predetermined point is the intersection of the first basic unit, the second basic unit and the third basic unit, the radius of the arc is one-half of the side length of the basic unit, and the automatic conveying unit starts to move along an arc when moving to the boundary between the first basic unit and the second basic unit.

In the motion control method, the arc motion is completed when the automatic conveying unit moves to the boundary between the second basic unit and the third basic unit.

Figure 3:
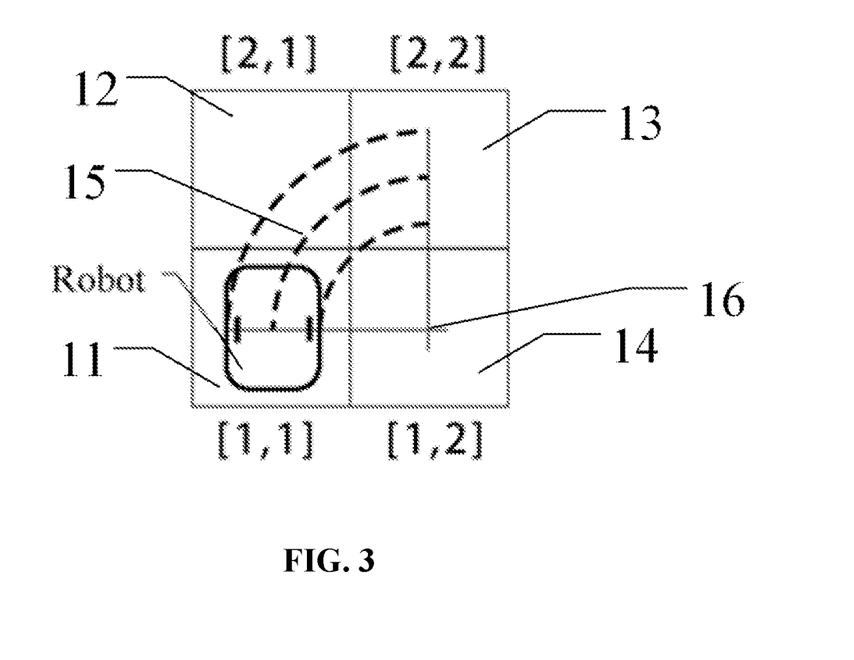
FIG. 3 is a schematic diagram illustrating an example of another turn according to embodiments of the present application.

FIG. 3 is a schematic diagram illustrating an example of another turn according to embodiments of the present application. As shown in FIG. 3, the automatic conveying unit makes a 90° turn in an arc during motion to pass through the curved route within several cells. When the automatic conveying unit needs to rotate 90° in the route planned for the automatic conveying unit by the system, the automatic conveying unit moves from the cell [1, 1] to the cell [2, 2] via the cell [2, 1] as shown in FIG. 3. When the automatic conveying unit reaches the center of the cell [1, 1], and the drive wheel connecting shaft coincides with the center line in the left-right direction of the cell [1, 1], the automatic conveying unit uses the differential for the left and right wheels to move along an arc centered on the center point of the cell [1, 2] and with a radius of the side length of one cell. The turn is completed when the automatic conveying unit is located at the center of the cell [2, 2] and the drive wheel connecting shaft of the automatic conveying unit coincides with the center line in the up-down direction of the cell [2, 2] after the drive wheel connecting shaft rotates 90°.

In this turning method, the automatic conveying unit has a larger radius of rotation and a smaller centrifugal force of rotation, and requirements for configuration of the center of gravity and the road holding of the automatic conveying unit are lower. Additionally, fixed requirements for items conveyed by the automatic conveying unit are lower. For example, a lower coefficient of friction may be allowed between an item and a surface carrying the item. Moreover, with a specific cell size, the wheel track of the automatic conveying unit can be effectively prevented from passing through the positioning identifier at the center point of the cell.

That is, in the motion control method, the predetermined point is the center point of a fourth basic unit (namely, a fourth unit grid 14) adjacent to the first basic unit in the direction of the turn; the radius of the arc is the side length of one basic unit; and the automatic conveying unit starts to move along an arc when moving to the center point of the first basic unit.

Furthermore, in the motion control method, the arc motion is completed when the automatic conveying unit moves to the center point of the third basic unit.

Figure 4:
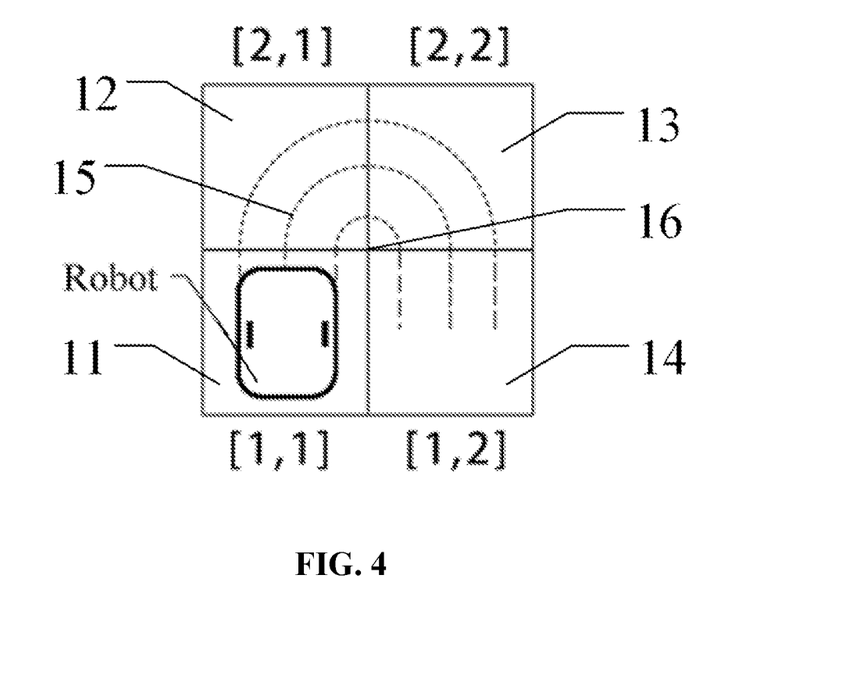
FIG. 4 is a schematic diagram illustrating an example of a continuous turn according to embodiments of the present application.

FIG. 4 is a schematic diagram illustrating an example of a continuous turn according to embodiments of the present application. As shown in FIG. 4, the automatic conveying unit makes a 180° turn in an arc during motion to pass through the curved route within one cell. When the automatic conveying unit needs to rotate 180° to return in the route planned for the automatic conveying unit by the system, the automatic conveying unit moves from the cell [1, 1] to the cell [1, 2] via the cell [2, 1] the cell [2, 2]. To make a continuous turn, the automatic conveying unit may make two consecutive turns by using the turning method as shown in FIG. 2 to complete the 180° turn.

Additionally, it is to be understood by those skilled in the art that although not shown in FIG. 4, the automatic conveying unit may make two consecutive turns by using the turning method as shown in FIG. 3 to complete the 180° turn. In this case, however, the route in which the automatic conveying unit returns is not in the cell adjacent to the cell in which the automatic conveying unit departs but in the cell which is one cell apart from the cell in which the automatic conveying unit departs.

Moreover, in the motion control method according to embodiments of the present application, the number of turns in a continuous turn is not limited to two. The automatic conveying unit may make three consecutive turns so that the function of turning from the place of departure to another direction can be achieved indirectly.

That is, in the motion control method, the determining that the automatic conveying unit is to make a turn includes: determining that the automatic conveying unit is to make a continuous turn including a plurality of turns; configuring the basic unit for making the turn of the automatic conveying unit includes configuring a plurality of basic units in the direction of the continuous turn of the automatic conveying unit to be basic units for making the turn; and controlling the automatic conveying unit to move along an arc centered on the predetermined point so that the automatic conveying unit completes the continuous turn by passing through the plurality of basic units.

As described above, since the motion control method according to embodiments of the present application is applicable to specific scenarios, the automatic conveying unit moves in the route planned in units of basic units in the field. Moreover, multiple automatic conveying units moving in the field simultaneously need to avoid each other.

In the existing situation, other automatic conveying units need to avoid only basic units covered by the motion route of a certain automatic conveying unit. However, in the motion control method according to embodiments of the present application, since the turning of the automatic conveying unit needs to occupy one or more additional basic units, a special mechanism is required.

That is, when the route planned for the automatic conveying unit by the system contains a route in which a 90° turn is needed, the automatic conveying unit needs to predetermine, before reaching the turning point, whether the cells before and after the turning point have been requested by other automatic conveying units. When determining that these cells are not requested by other automatic conveying units, the automatic conveying unit requests these cells from the system and forbids other automatic conveying units from moving into these cells. Then the automatic conveying makes a turn in an arc by using the motion control method according to embodiments of the present application.

If the robot automatic conveying unit finds, in the process of requesting cells, that any one of the three cells, that is, the cell containing the turning point and the cells before and after the turning point, has been requested by other automatic conveying units, then the automatic conveying unit gives up making a turn in an arc, and adopts the conventional method, that is, moves into the cell containing the turning point, rotates 90° in situ, waits until the occupied cells are released and then leaves.

In the case where the method as shown in FIG. 3 is used or in some special cases of the method as shown in FIG. 2, if the area covered by the automatic conveying unit includes not only the cells in the route but also a cell outside the route for the turning, then the automatic conveying unit needs to determine whether to predetermine this cell before making a turn during motion. If this cell is requested or is being used by other automatic conveying units, the automatic conveying unit also chooses to make a turn in situ instead of in an arc during motion.

Furthermore, this is also the case with the scenario where the automatic conveying unit makes a continuous turn. For example, in the example of a continuous turn as shown in FIG. 4, the automatic conveying unit needs to predetermine at least three other cells, and the automatic conveying unit can merely make a continuous turn when none of the at least three other cells is requested or is being used.

That is, in the motion control method, before configuring the second basic unit to be the basic unit for making the turn, the method further includes determining whether the second basic unit has been requested by other automatic conveying units; and in response to determining that the second basic unit is not requested by the other automatic conveying unit, forbidding the other automatic conveying unit from entering the second basic unit.

Moreover, in the motion control method, before configuring the second basic unit to be the basic unit for making the turn, the method further includes determining whether the second basic unit and the fourth basic unit have been requested by other automatic conveying units; and in response to determining that the second basic unit and the fourth basic unit are not requested by the other automatic conveying unit, forbidding the other automatic conveying unit from entering the second basic unit and the fourth basic unit.

As described above, the motion control method according to embodiments of the present application is applicable to an automatic sorting system. This will be further explained below in conjunction with FIG. 5.

Figure 5:
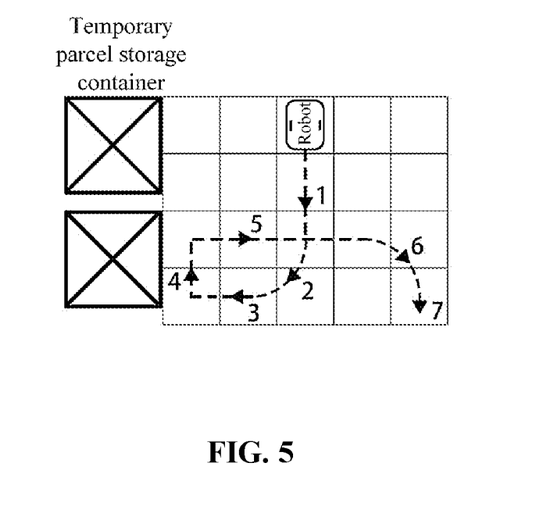
FIG. 5 is a schematic diagram of a motion control method applied to parcel delivery according to embodiments of the present application.

FIG. 5 is a schematic diagram of a motion control method applied to parcel delivery according to embodiments of the present application. As shown in FIG. 5, when performing a delivery task in the field, the robot needs to switch between routes in different channels. The function of a delivery channel close to temporary parcel storage containers is to provide a delivery space. Due to deceleration and temporary stopping during delivery, the robot in the delivery channel moves at a low speed. Moreover, robots having the same delivery target may queue up in the delivery channel to deliver a parcel in sequence. A channel in a region distant from temporary parcel storage containers is a high-speed channel. The function of the high-speed channel is to ensure that the robot quickly reaches the region near the destination. In the high-speed channel, the robot moves at a high speed because the robot has no delivery task. In one delivery, the robot may use the method of turning during motion as shown in FIGS. 2 to 4 to assist in quickly passing through a turn. FIG. 5 shows a process of making a turn in an arc during one delivery.

As shown in FIG. 5, the process of making a turn in an arc during motion during one delivery is described below.

1. The robot approaches the delivery point from the high-speed channel.

2. The robot departs from the high-speed channel by making a 90° turn in an arc.

3. The robot moves straight to the delivery position.

4. The robot starts delivery and then stars to move after rotating the chassis 90° in situ. The robot continues the delivery during motion. After the delivery, the robot rotates the chassis to the direction for leaving the delivery channel.

5. The robot moves straight to approach and return to the high-speed channel.

6. The robot makes a turn in an arc to enter the high-speed channel.

7. The robot enters the high-speed channel and leaves.

During the preceding process, the delivery direction of the delivery device of the robot keeps facing the temporary parcel storage container through rotation of a pan-tilt controller.

In embodiments of the present application, the automatic conveying unit is not limited to a robot as shown in FIG. 5 and the container for containing items is not limited to a temporary parcel storage container as shown in FIG. 5.

That is, in the motion control method, the field includes a high-speed motion region and a low-speed motion region; and determining that the automatic conveying unit is to make a turn includes determining whether the automatic conveying unit is to enter the low-speed motion region from the high-speed motion region; and in response to determining that the automatic conveying unit is to enter the low-speed motion region from the high-speed motion region, determining that the automatic conveying unit is to make a turn.

Moreover, in the motion control method, the low-speed motion region is a delivery channel for dropping a to-be-sorted item in an automatic sorting system.

The motion control method according to embodiments of the present application reduces the time loss when the automatic conveying unit makes a turn, especially saves the time used by the automatic conveying unit to perform one delivery task. On the other hand, the automatic conveying unit chooses to make a turn in an arc, thereby reducing the impact on the automatic conveying units in the same direction after the automatic conveying unit that is making a turn. Thus, the combination of these two aspects can significantly improve the motion efficiency of the automatic conveying unit.

Motion Control Unit and Automatic Conveying Unit

According to another aspect of embodiments of the present application, a motion control apparatus for an automatic conveying unit that moves within a field including a plurality of basic units is provided. The apparatus includes a turn determination unit, which is configured to determine that the automatic conveying unit is to make a turn; a turn configuration unit, which is configured to configure a second basic unit in front of a first basic unit where the automatic conveying unit is located to be a basic unit for making the turn; and a motion control unit, which is configured to control the automatic conveying unit to move along an arc centered on a predetermined point so that the automatic conveying unit completes the turn when moving through the second basic unit to a third basic unit adjacent to the second basic unit in the direction of the turn.

Figure 6:
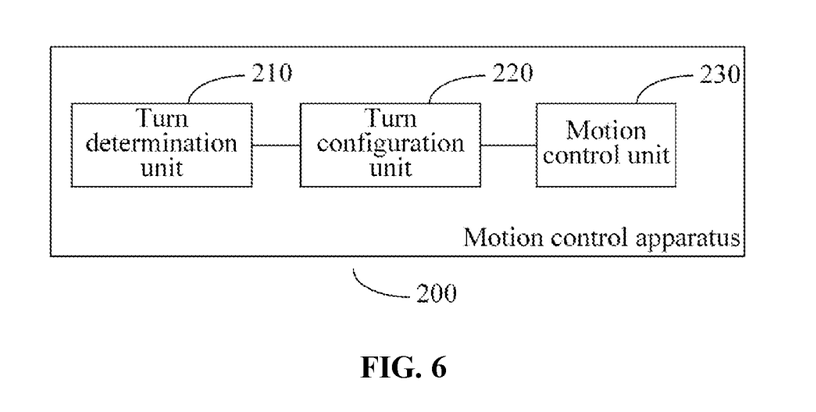
FIG. 6 is a schematic block diagram of a motion control apparatus according to embodiments of the present application.

FIG. 6 is a schematic block diagram of a motion control apparatus according to embodiments of the present application. As shown in FIG. 6, the motion control apparatus 200 according to embodiments of the present application includes a turn determination unit 210, which is configured to determine that the automatic conveying unit is to make a turn; a turn configuration unit 220, which is configured to, in response to that the turn determination unit 210 determines that the automatic conveying unit is to make a turn, configure a second basic unit in front of a first basic unit where the automatic conveying unit is located to be a basic unit for making the turn; and a motion control unit 230, which is configured to control the automatic conveying unit to move along an arc centered on a predetermined point so that the automatic conveying unit completes the turn when moving through the second basic unit configured by the turn configuration unit 220 to a third basic unit adjacent to the second basic unit in the direction of the turn.

In the motion control apparatus, the predetermined point is an intersection of the first basic unit, the second basic unit and the third basic unit; a radius of the arc is one-half of a side length of a basic unit; and the motion control unit is configured to control the automatic conveying unit to start to move along an arc when the automatic conveying unit moves to a boundary between the first basic unit and the second basic unit.

In the motion control apparatus, the predetermined point is a center point of a fourth basic unit adjacent to the first basic unit in the direction of the turn; a radius of the arc is a side length of a basic unit; and the motion control unit is configured to control the automatic conveying unit to start to move along an arc when the automatic conveying unit moves to a center point of the first basic unit.

In the motion control apparatus, the turn determination unit is further configured to determine that the automatic conveying unit is to make a continuous turn comprising a plurality of turns; the turn configuration unit is further configured to configure a plurality of basic units in the direction of the continuous turn of the automatic conveying unit to be basic units for making the turn; and the motion control unit is configured to control the automatic conveying unit to move along an arc centered on the predetermined point so that the automatic conveying unit completes the continuous turn by passing through the plurality of basic units.

In the motion control apparatus, the turn configuration unit is further configured to determine whether the second basic unit has been requested by other automatic conveying units; and in response to determining that the second basic unit is not requested by the other automatic conveying units, forbid the other automatic conveying units from entering the second basic unit.

In the motion control apparatus, the turn configuration unit is further configured to determine whether the second basic unit and the fourth basic unit have been requested by other automatic conveying units; and in response to determining that the second basic unit and the fourth basic unit are not requested by the other automatic conveying units, forbid the other automatic conveying units from entering the second basic unit and the fourth basic unit.

In the motion control apparatus, the field includes a high-speed motion region and a low-speed motion region; and the turn determination unit is configured to determine whether the automatic conveying unit is to enter the low-speed motion region from the high-speed motion region; and in response to determining that the automatic conveying unit is to enter the low-speed motion region from the high-speed motion region, determine that the automatic conveying unit is to make a turn.

In the motion control apparatus, the low-speed motion region is a delivery channel for dropping of a to-be-sorted item in an automatic sorting system.

It is to be understood by those skilled in the art that other details of the motion control apparatus according to embodiments of the present application are the same as the corresponding details described in the motion control method according to embodiments of the present application and will not be repeated to avoid redundancy.

According to another aspect of embodiments of the present application, an automatic conveying unit configured to move within a field including a plurality of basic units is provided. The automatic conveying unit includes the preceding motion control apparatus.

Figure 7:
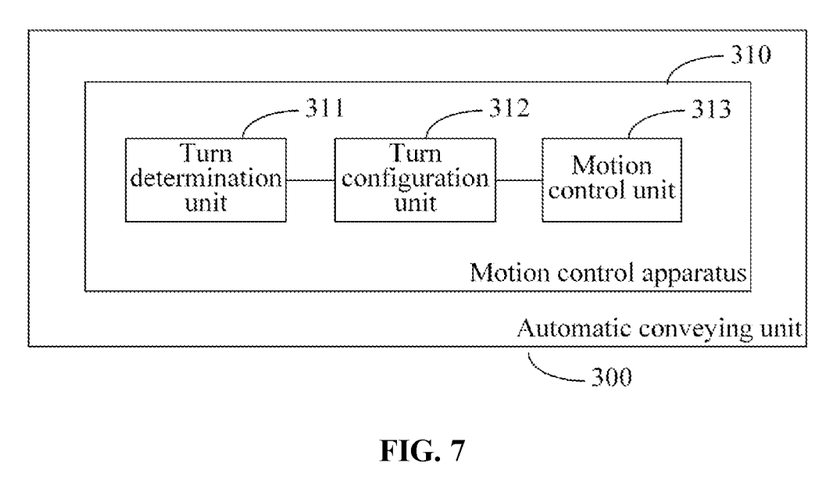
FIG. 7 is a schematic block diagram of an automatic conveying unit according to embodiments of the present application.

FIG. 7 is a schematic block diagram of an automatic conveying unit according to embodiments of the present application. As shown in FIG. 7, the automatic conveying unit 300 according to embodiments of the present application includes a motion control apparatus 310. The motion control apparatus 310 includes a turn determination unit 311, which is configured to determine that the automatic conveying unit is to make a turn; a turn configuration unit 312, which is configured to, in response to that the turn determination unit 311 determines that the automatic conveying unit is to make a turn, configure a second basic unit in front of a first basic unit where the automatic conveying unit is located to be a basic unit for making the turn; and a motion control unit 313, which is configured to control the automatic conveying unit to move along an arc centered on a predetermined point so that the automatic conveying unit completes the turn when moving through the second basic unit configured by the turn configuration unit 312 to a third basic unit adjacent to the second basic unit in the direction of the turn.

In the automatic conveying unit, the predetermined point is an intersection of the first basic unit, the second basic unit and the third basic unit; a radius of the arc is one-half of a side length of a basic unit; and the motion control unit is configured to control the automatic conveying unit to start to move along an arc when the automatic conveying unit moves to a boundary between the first basic unit and the second basic unit.

In the automatic conveying unit, the predetermined point is a center point of a fourth basic unit adjacent to the first basic unit in the direction of the turn; a radius of the arc is a side length of a basic unit; and the motion control unit is configured to control the automatic conveying unit to start to move along an arc when the automatic conveying unit moves to a center point of the first basic unit.

In the automatic conveying unit, the turn determination unit is further configured to determine that the automatic conveying unit is to make a continuous turn comprising a plurality of turns; the turn configuration unit is further configured to configure a plurality of basic units in the direction of the continuous turn of the automatic conveying unit to be basic units for making the turn; and the motion control unit is configured to control the automatic conveying unit to move along an arc centered on the predetermined point so that the automatic conveying unit completes the continuous turn by passing through the plurality of basic units.

In the automatic conveying unit, the turn configuration unit is further configured to determine whether the second basic unit has been requested by other automatic conveying units; and in response to determining that the second basic unit is not requested by the other automatic conveying unit, forbid the other automatic conveying unit from entering the second basic unit.

In the automatic conveying unit, the turn configuration unit is further configured to determine whether the second basic unit and the fourth basic unit have been requested by other automatic conveying units; and in response to determining that the second basic unit and the fourth basic unit are not requested by the other automatic conveying units, forbid the other automatic conveying units from entering the second basic unit and the fourth basic unit.

In the automatic conveying unit, the field includes a high-speed motion region and a low-speed motion region; and the turn determination unit is configured to determine whether the automatic conveying unit is to enter the low-speed motion region from the high-speed motion region; and in response to determining that the automatic conveying unit is to enter the low-speed motion region from the high-speed motion region, determine that the automatic conveying unit is to make a turn.

In the automatic conveying unit, the low-speed motion region is a delivery channel for dropping a to-be-sorted item in an automatic sorting system.

Similarly, other details of the automatic conveying unit have been described in the motion control method according to embodiments of the present application and will not be repeated to avoid redundancy.

Layout of an Automatic Sorting System

Figure 8:
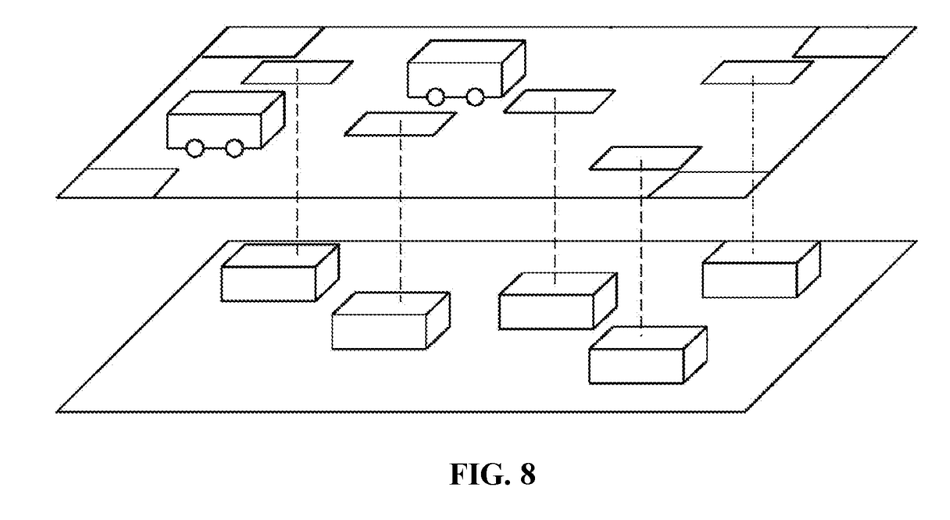
FIG. 8 is a schematic diagram illustrating an example of an existing automatic sorting system using robots.

FIG. 8 is a schematic diagram illustrating an example of an existing automatic sorting system using robots. As shown in FIG. 8, the automatic sorting system adopts the form of "robot+steel platform". The operator places, at the supply station, a parcel on a robot carrying device. The robot carries the parcel and moves to the position of a separate steel opening for parcel dropping and then delivers the parcel to this opening to complete the parcel sorting task.

In the existing automatic sorting system using robots, the system adopts a raised platform structure (for example, a steel platform). The robot moves on the platform, and the container for receiving the parcel is below the platform. Although the purpose of sorting is achieved in this structure, the construction and the use of the platform make the system greatly compromised in terms of flexibility and costs. Thus, an automatic sorting system with higher flexibility and lower costs is required.

Additionally, in this system, separate openings for parcel dropping are arranged in an array in the robot motion region (as shown in FIG. 8, separate openings for parcel dropping are arranged in an array within the plane of the steel platform). Thus, while the robot performs the parcel dropping task, other robots may have to wait or different robots may avoid each other. As a result, the sorting efficiency of the system is reduced. In particular, when a large number of robots with a high density exist in the system, waiting or avoidance of the robots will cause the sorting efficiency of the system to decrease sharply.

Thus, it is desirable to make an improvement to this automatic sorting system to overcome the bottleneck of the system efficiency, reduce the occurrence of waiting or avoidance of the robots caused by parcel dropping and effectively improve the efficiency of the automatic parcel sorting system.

Regarding the flexibility of the automatic parcel sorting system, the automatic sorting system has high requirements for flexibility due to periodicity in the logistics industry. In the logistics industry, the items that need to be conveyed are distributed in a distinct pattern of peaks and valleys. For example, in the express industry, the volume of goods increases sharply during a large online shopping festival while decreases dramatically during a holiday like the Spring Festival. Thus, the automatic sorting system needs to be able to cope well with the imbalance in the quantity of goods that need to be conveyed, so as to ensure that the system meets the needs without causing the system to be idle.

Thus, according to an example of embodiments of the present application, an automatic sorting system is provided. The automatic sorting system includes a parcel supply region, which is configured to distribute a to-be-sorted item; a conveying region, which is configured such that at least one automatic conveying unit moves in the conveying region, where the automatic conveying unit is configured to convey the to-be-sorted item; and a parcel dropping region that includes a plurality of sorting targets, where the automatic conveying unit drops, in the parcel dropping region, the to-be-sorted item to a corresponding sorting target. The conveying region and the parcel dropping region are on the same plane and do not overlap each other.

Compared with the automatic sorting system adopting the form of "robot+steel platform" as shown in FIG. 8, the automatic sorting system according to embodiments of the present application adopts a planar arrangement, that is, the conveying region and the parcel dropping region are disposed on the same plane, thereby avoiding the costs incurred by raising the conveying region.

Preferably, in the automatic sorting system according to embodiments of the present application, the conveying region and the parcel dropping region are disposed on the ground.

Thus, the automatic sorting system according to embodiments of the present application further adopts a "floor" structure so that the conveying region and the parcel dropping region are located on the same plane. Correspondingly, the automatic conveying unit moving in the conveying region and the sorting targets included in the parcel dropping region are also located on the same plane. In this way, it is not needed to construct a platform for the automatic sorting system separately, avoiding the loss of flexibility and costs.

Of course, it is to be understood by those skilled in the art that in the automatic sorting system according to embodiments of the present application, the conveying region and the parcel dropping region may be disposed on the ground or disposed on another plane as needed. For example, the automatic sorting system according to embodiments of the present application may be implemented as a three-dimensional automatic sorting system including multiple planes provided with a conveying region and a parcel dropping region. This is particularly applicable to the case where the field is limited so that the height space can be fully utilized and the costs of the automatic sorting system can be reduced.

Additionally, in the automatic sorting system according to embodiments of the present application, the conveying region and the parcel dropping region do not overlap each other. That is, the conveying region and the parcel dropping region occupy different parts of the physical plane space. In this way, when dropping the parcel, the automatic conveying unit does not need to wait for other automatic conveying units to deliver parcels or avoid other automatic conveying units, thereby significantly improving the efficiency of the automatic sorting system.

Here the automatic conveying unit in the automatic sorting system according to embodiments of the present application may be a robot or other automatic conveying units for conveying items.

Additionally, a sorting target in the automatic sorting system according to embodiments of the present application relates to the category corresponding to a to-be-sorted item after the to-be-sorted item is sorted. For example, in the express industry, typically one sorting target corresponds to one particular conveying route, and this sorting target may be a container for containing parcels that need to be conveyed in this conveying route. However, it is to be understood by those skilled in the art that the sorting target according to embodiments of the present application is not limited to the category corresponding to a particular conveying route and may involve another category, such as the size of the item or the property (like fragility) of the item, corresponding to the sorted item.

In summary, the automatic sorting system according to embodiments of the present application has a non-overlapping planar arrangement. The core of this system is the non-overlapping planar arrangement of the conveying region and the parcel dropping region. Thus, it is to be understood by those skilled in the art that whether there are actually to-be-sorted items that are sorted in the automatic sorting system according to embodiments of the present application is not an essential feature of this system. That is, even if no automatic conveying unit conveys the to-be-sorted item from the parcel supply region to the parcel dropping region via the conveying region, as long as the conveying region and the parcel dropping region are in a non-overlapping planar arrangement, this system is intended to be within the scope of the present application.

Moreover, the sorting targets included in the parcel dropping region are not necessarily real objects. For example, the parcel falling region may be divided into a plurality of regions and each region corresponds to one sorting target so that items are sorted. Of course, the sorting targets may also be real shelves, real baskets and the like. Moreover, to increase the flexibility of the system, when the sorting target is a container for accommodating items, such a container is preferably movable so that after being filled up, the container can be easily replaced.

That is, in the automatic sorting system according to embodiments of the present application, the sorting target is a movable container for accommodating sorted items.

As mentioned earlier, in the automatic sorting system according to embodiments of the present application, the conveying region and the parcel dropping region are disposed on the same plane and do not overlap each other. Further, in the automatic sorting system, the parcel supply region is located on the same plane as the conveying region and the parcel dropping region and does not overlap the conveying region and the parcel dropping region. In this way, further, the high flexibility, low costs and high efficiency of the automatic sorting system according to embodiments of the present application may be ensured by the configuration of the parcel supply region.

In terms of the layout of the actual parcel supply region, conveying region and parcel dropping region, multiple solutions may be adopted in the automatic sorting system according to embodiments of the present application. In general, the parcel supply region and the parcel dropping region need to be configured according to the conveying region. For example, in one example, the parcel supply region and the parcel dropping region are located on the two sides of the conveying region so that the automatic conveying unit conveys items from the parcel supply region to different sorting targets in the parcel dropping region so as to sort the items. Here the conveying region may be in various shapes according to actual field conditions. For example, the conveying region may be a common rectangle or a common square. In this case, the parcel supply region may be located in the middle of one side of the conveying region and the parcel dropping region may be located on the opposite side of the conveying region. Here it is to be understood by those skilled in the art that parcel dropping regions may be disposed on multiple sides of the conveying region when a large number of sorting targets are involved but the area of the conveying region is limited. For example, it is feasible to provide parcel dropping regions on three sides of the rectangular or square conveying region other than the side on which the parcel supply region is located so as to satisfy the item sorting needs.

In another example, the parcel supply region may be disposed in the center of the conveying region and the parcel dropping region may be disposed around the conveying region so that the space of the conveying region can be utilized to the greatest extent possible. This is particularly applicable to the case where the field is limited.

Figure 9:
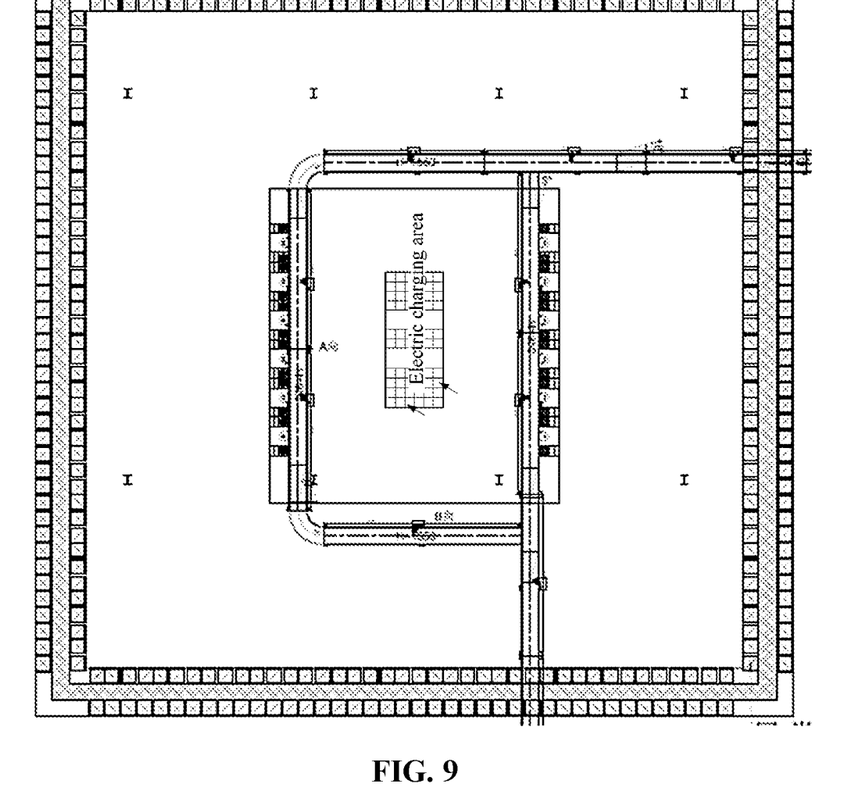
FIG. 9 is a schematic diagram illustrating an example of region configuration of an automatic sorting system according to embodiments of the present application.

FIG. 9 is a schematic diagram illustrating an example of region configuration of an automatic sorting system according to embodiments of the present application. As shown in FIG. 9, the parcel supply region is disposed in the center of the field, the parcel dropping region is disposed around the field, and the region between the parcel supply region and the parcel dropping region is the conveying region. Moreover, in FIG. 9, since to-be-sorted items need to be conveyed to the parcel supply region so as to be sorted, a space for conveying the to-be-sorted items to the parcel supply region is left on one side of the field. Here it is to be understood by those skilled in the art that if the to-be-sorted items have been conveyed to the parcel supply region at a time, then the right side of FIG. 2 may also be provided with a parcel dropping region.

That is, even if the parcel supply region is disposed in the center of the conveying region, it is not necessary to provide parcel dropping regions on all of the four sides of the conveying region and it is feasible to provide an appropriate number of sorting targets according to sorting needs so as to determine whether all of the sorting targets can be accommodated on one side of the conveying region or need to occupy one or more other sides.

Furthermore, from another point of view, in the automatic sorting system according to embodiments of the present application, since the to-be-sorted items are conveyed from the parcel supply region to the parcel dropping region and the conveying region is apparently located between the parcel supply region and the parcel dropping region, it may be deemed that the shape of the parcel supply region and the shape of the parcel dropping region, especially the shape of the parcel dropping region, determine the shape of the conveying region. Thus, it is feasible to first determine the layout of the parcel dropping region and then determine the layout of the conveying region on the basis of the shape of the parcel dropping region.

Moreover, as described above, a sorting target is preferably movable, so it is feasible to provide an appropriate number of sorting targets according to the number of the to-be-sorted items in the automatic sorting system according to embodiments of the present application. Similarly, parcel sorting in the express industry is used as an example. In this example, assuming that the to-be-sorted parcels require 30 routes, then it is feasible to determine the number of parcels to be conveyed in each route according to the existing data and then provide sorting targets corresponding to each route. For example, if it is determined that a certain route corresponds to a large number of parcels, then it is feasible to provide multiple sorting targets corresponding to this route so that the parcels corresponding to this route can be sorted simultaneously and the overall efficiency of the system will not be reduced due to this route. Additionally, if the number of to-be-sorted parcels increases significantly during a certain period of time, then it is feasible to increase the number of sorting targets corresponding to each route. For example, if each route corresponds to one sorting target in normal times, then it is feasible to provide two or more sorting targets for each route in busy hours so that the automatic sorting system according to embodiments of the present application can cope well with periodicity in the logistics industry so as to have good flexibility.

Of course, when the number of sorting targets increases, the area of the original parcel dropping region may be insufficient for the sorting targets. It is feasible to solve this problem simply by expanding the area of the conveying region and correspondingly expanding the area of the parcel dropping region.

Additionally, since in the automatic sorting system according to embodiments of the present application, the parcel supply region, the conveying region and the parcel dropping region are located on the same plane, in addition to the preceding method of implementing the automatic sorting system in a three-dimensional space manner, it is feasible to duplicate the automatic sorting system to the ground.

As described above, it is feasible to expand the automatic sorting system according to embodiments of the present application by using the method of expanding the area of the conveying region and correspondingly expanding the area of the parcel dropping region. However, in the case where the area of the conveying region increases, the routes in which the automatic conveying unit moves in the conveying region may change. It is an optimal solution for such an automatic conveying unit as a robot to follow a preset route. Thus, to prevent the change of the conveying region from affecting the automatic conveying unit, it is feasible to duplicate the automatic sorting system according to embodiments of the present application without changing conveying region. That is, a new automatic sorting system is configured. This new automatic sorting system has the same planar arrangement of parcel supply region, conveying region and parcel dropping region as the original automatic sorting system, thereby ensuring that the original automatic sorting system and the new automatic sorting system are the same in terms of the configuration of the automatic conveying unit.

That is, according to another example of embodiments of the present application, an automatic sorting system is provided. The automatic sorting system includes: a first parcel supply region, which is configured to distribute a to-be-sorted item; a first conveying region, which is configured such that at least one automatic conveying unit moves in the conveying region, where the automatic conveying unit is configured to convey the to-be-sorted item; and a first parcel dropping region that includes a plurality of sorting targets, where the automatic conveying unit drops, in the parcel dropping region, the to-be-sorted item to a corresponding sorting target. The first conveying region and the first parcel dropping region are located on the same plane, and the first conveying region does not overlap with the first parcel dropping region. This automatic sorting system further includes a second parcel supply region, a second conveying region and a second parcel dropping region. The second planar layout of the second parcel supply region, second conveying region and second parcel dropping region is the same as the first planar layout of the first parcel supply region, first conveying region and first parcel dropping region.

Here, it is to be understood by those skilled in the art that the same planar layout means that the various regions have the same planar arrangement and is not intended to limit the number of automatic conveying units moving in the second conveying region, and means that the sorting target objects in the second parcel dropping region must be the same as those in the first conveying region and the same as those in the first parcel dropping region.

Additionally, according to an example of embodiments of the present application, an automatic sorting system is provided. The automatic sorting system includes an automatic conveying unit, which is configured to convey a to-be-sorted item; a sorting region, in which the automatic conveying unit operates to sort the to-be-sorted item; and a control device, which is configured to control sorting of the to-be-sorted item and to control motion of the automatic conveying unit in the sorting region. The sorting region further includes a parcel supply region, which is configured to distribute a to-be-sorted item; a conveying region, which is configured such that at least one automatic conveying unit moves in the conveying region, where the automatic conveying unit is configured to convey the to-be-sorted item through the conveying region; and a parcel dropping region that includes a plurality of sorting targets, where the automatic conveying unit drops, in the parcel dropping region, the to-be-sorted item to a corresponding sorting target. The conveying region and the parcel dropping region are on the same plane and do not overlap each other.

Automatic Sorting System with Motion Control

Figure 10:
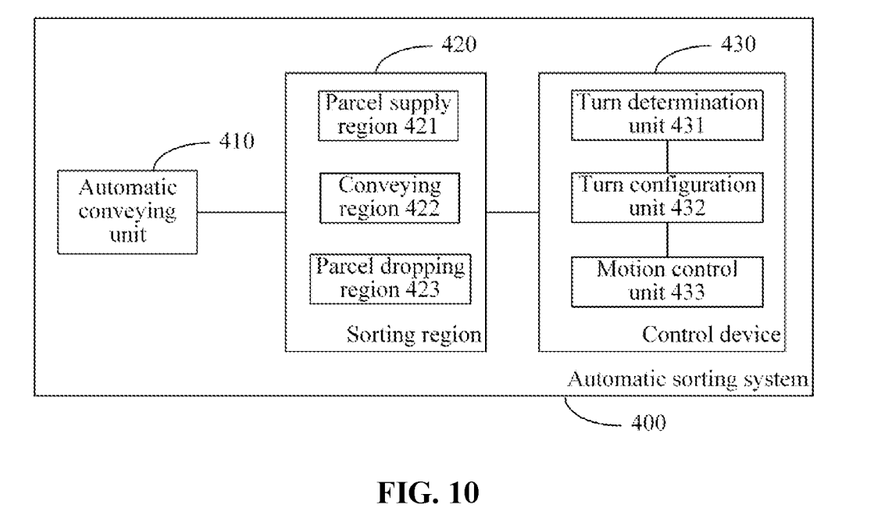
FIG. 10 is a schematic block diagram of an automatic sorting system according to embodiments of the present application.

FIG. 10 is a schematic block diagram of an automatic sorting system according to embodiments of the present application. As shown in FIG. 10, the automatic sorting system 400 according to embodiments of the present application includes an automatic conveying unit 410, which is configured to convey a to-be-sorted item; a sorting region 420, in which the automatic conveying unit 410 operates to sort the to-be-sorted item; and a control device 430, which is configured to control sorting of the to-be-sorted item and to control motion of the automatic conveying unit 410 in the sorting region. The control device 430 further includes a device for controlling the arc turn of the automatic conveying unit. That is, the control device 430 further includes a turn determination unit 431, which is configured to determine that the automatic conveying unit is to make a turn; a turn configuration unit 432, which is configured to, in response to that the turn determination unit 431 determines that the automatic conveying unit is to make a turn, configure a second basic unit in front of a first basic unit where the automatic conveying unit is located to be a basic unit for making the turn; and a motion control unit 433, which is configured to control the automatic conveying unit to move along an arc centered on a predetermined point so that the automatic conveying unit completes the turn when moving through the second basic unit configured by the turn configuration unit 432 to a third basic unit adjacent to the second basic unit in the direction of the turn.

In the automatic sorting system, the predetermined point is an intersection of the first basic unit, the second basic unit and the third basic unit; a radius of the arc is one-half of a side length of a basic unit; and the motion control unit is configured to control the automatic conveying unit to start to move along an arc when the automatic conveying unit moves to a boundary between the first basic unit and the second basic unit.

In the automatic sorting system, the predetermined point is a center point of a fourth basic unit adjacent to the first basic unit in the direction of the turn; a radius of the arc is a side length of a basic unit; and the motion control unit is configured to control the automatic conveying unit to start to move along an arc when the automatic conveying unit moves to a center point of the first basic unit.

In the automatic sorting system, the turn determination unit is further configured to determine that the automatic conveying unit is to make a continuous turn comprising a plurality of turns; the turn configuration unit is further configured to configure a plurality of basic units in the direction of the continuous turn of the automatic conveying unit to be basic units for making the turn; and the motion control unit is configured to control the automatic conveying unit to move along an arc centered on the predetermined point so that the automatic conveying unit completes the continuous turn by passing through the plurality of basic units.

In the automatic sorting system, the turn configuration unit is further configured to determine whether the second basic unit has been requested by other automatic conveying units; and in response to determining that the second basic unit is not requested by the other automatic conveying unit, forbid the other automatic conveying unit from entering the second basic unit.

In the automatic sorting system, the turn configuration unit is further configured to determine whether the second basic unit and the fourth basic unit have been requested by other automatic conveying units; and in response to determining that the second basic unit and the fourth basic unit are not requested by the other automatic conveying unit, forbid the other automatic conveying unit from entering the second basic unit and the fourth basic unit.

In the automatic sorting system, the field includes a high-speed motion region and a low-speed motion region; and the turn determination unit is configured to determine whether the automatic conveying unit is to enter the low-speed motion region from the high-speed motion region; and in response to determining that the automatic conveying unit is to enter the low-speed motion region from the high-speed motion region, determine that the automatic conveying unit is to make a turn.

In the automatic sorting system, the low-speed motion region is a delivery channel for dropping of a to-be-sorted item in an automatic sorting system.

Furthermore, as shown in FIG. 10, in the automatic sorting system, the sorting region 220 further includes a parcel supply region 221, which is configured to distribute a to-be-sorted item; a conveying region 222, which is configured such that at least one automatic conveying unit 210 moves in the conveying region, where the automatic conveying unit 210 is configured to convey the to-be-sorted item through the conveying region 222; and a parcel dropping region 223 that includes a plurality of sorting targets, where the automatic conveying unit 210 drops, in the parcel dropping region, the to-be-sorted item to a corresponding sorting target. The conveying region 222 and the parcel dropping region 223 are on the same plane and do not overlap each other.

It is to be understood by those skilled in the art that embodiments of the present application described above and shown in the accompanying drawings are provided by way of example and not intended to limit the present application. The purpose of the present application has been achieved completely and effectively. The function and the structure principle of the present application have been shown and described in the embodiments. Implementation modes of the present application may be modified or changed without departing from this principle.

What is claimed is:

1. A motion control method for an automatic conveying unit that moves within a field comprising a plurality of unit grids, comprising:
   determining that the automatic conveying unit is to make a turn;
   configuring a second unit grid in front of a first unit grid where the automatic conveying unit is located to be a unit grid for making the turn; and
   controlling the automatic conveying unit to move along an arc centered on a predetermined point so that the automatic conveying unit completes the turn when moving through the second unit grid to a third unit grid adjacent to the second unit grid in a direction of the turn;
   wherein the predetermined point is a center point of a fourth unit grid adjacent to the first unit grid in the direction of the turn;
   a radius of the arc is a side length of the unit grid; and
   the automatic conveying unit starts to move along the arc when moving to a center point of the first unit grid;
   wherein before configuring the second unit grid to be the unit grid for making the turn:
   determining whether the second unit grid and the fourth unit grid are requested by other automatic conveying units; and
   in response to determining that the second unit grid and the fourth unit grid are not requested by the other automatic conveying units, forbidding the other automatic conveying units from entering the second unit grid and the fourth unit grid.

2. The motion control method of claim 1, wherein the determining that the automatic conveying unit is to make the turn comprises:
   determining that the automatic conveying unit is to continuously make a plurality of turns;

wherein configuring the unit grid for making the turn of the automatic conveying unit comprises:

configuring a plurality of unit grids in a direction of the plurality of turns of the automatic conveying unit to be unit grids for making the turns; and controlling the automatic conveying unit to move along the arc centered on the predetermined point so that the automatic conveying unit completes the plurality of turns by passing through the plurality of unit grids.

3. The motion control method of claim 1, wherein the field comprises a high-speed motion region and a low-speed motion region; and wherein the determining that the automatic conveying unit is to make the turn comprises:

determining whether the automatic conveying unit is to enter the low-speed motion region from the high-speed motion region; and in response to determining that the automatic conveying unit is to enter the low-speed motion region from the high-speed motion region, determining that the automatic conveying unit is to make the turn.

4. The motion control method of claim 3, wherein the low-speed motion region is a delivery channel for dropping a to-be-sorted item in an automatic sorting system.

5. An automatic conveying unit, configured to move within a field having a plurality of basic units, comprising: a motion control apparatus, wherein the motion control apparatus comprises: at least one processor and a memory storing instructions executable by the at least one processor, and the at least one processor is configured to:

determine that an automatic conveying unit is to make a turn;

configure a second unit grid in front of a first unit grid where the automatic conveying unit is located to be a unit grid for making the turn; and control the automatic conveying unit to move along an arc centered on a predetermined point so that the automatic conveying unit completes the turn when moving through the second unit grid to a third unit grid adjacent to the second unit grid in a direction of the turn;

wherein the predetermined point is a center point of a fourth unit grid adjacent to the first unit grid in the direction of the turn;

a radius of the arc is a side length of the unit grid; and the at least one processor is configured to control the automatic conveying unit to start to move along the arc when moving to a center point of the first unit grid;

wherein before configuring the second unit grid to be the unit grid for making the turn, the at least one processor is configured to:

determine whether the second unit grid and the fourth unit grid are requested by other automatic conveying units; and in response to determining that the second unit grid and the fourth unit grid are not requested by the other automatic conveying units, forbid the other automatic conveying units from entering the second unit grid and the fourth unit grid.

6. An automatic sorting system, comprising:

an automatic conveying unit, which is configured to convey a to-be-sorted item;

a sorting region, in which the automatic conveying unit operates to sort the to-be-sorted item; and a control device, comprising at least one processor and a memory storing instructions executable by the at least one processor, wherein the at least one processor is configured to control sorting of the to-be-sorted item and to control the automatic conveying unit to move in the sorting region, and the at least one processor is further configured to:

determine that the automatic conveying unit is to make a turn;

configure a second unit grid in front of a first unit grid where the automatic conveying unit is located to be a unit grid for making the turn; and control the automatic conveying unit to move along an arc centered on a predetermined point so that the automatic conveying unit completes the turn when moving through the second unit grid to a third unit grid adjacent to the second unit grid in a direction of the turn;

wherein the predetermined point is a center point of a fourth unit grid adjacent to the first unit grid in the direction of the turn;

a radius of the arc is a side length of the unit grid; and the at least one processor is further configured to control the automatic conveying unit to start to move along the arc when moving to a center point of the first unit grid;

wherein before configuring the second unit grid to be the unit grid for making the turn, the at least one processor is configured to:

determine whether the second unit grid and the fourth unit grid are requested by other automatic conveying units; and in response to determining that the second unit grid and the fourth unit grid are not requested by the other automatic conveying units, forbid the other automatic conveying units from entering the second unit grid and the fourth unit grid.

7. The automatic conveying unit of claim 5, wherein the at least one processor is configured to determine, in the following manner, that the automatic conveying unit is to make a turn:

determining that the automatic conveying unit is to continuously make a plurality of turns;

wherein the at least one processor is configured to configure the unit grid for making the turn of the automatic conveying unit in the following manner:

configuring a plurality of unit grids in a direction of the plurality of turns of the automatic conveying unit to be unit grids for making the turns; and controlling the automatic conveying unit to move along the arc centered on the predetermined point so that the automatic conveying unit completes the plurality of turns by passing through the plurality of unit grids.

8. The automatic conveying unit of claim 5, wherein the field comprises a high-speed motion region and a low-speed motion region; and wherein the at least one processor is configured to determine, in the following manner, that the automatic conveying unit is to make a turn:

determining whether the automatic conveying unit is to enter the low-speed motion region from the high-speed motion region; and in response to determining that the automatic conveying unit is to enter the low-speed motion region from the high-speed motion region, determining that the automatic conveying unit is to make the turn.

9. The automatic conveying unit of claim 8, wherein the low-speed motion region is a delivery channel for dropping a to-be-sorted item in an automatic sorting system.

10. The automatic sorting system of claim 6, wherein the at least one processor is configured to determine, in the following manner, that the automatic conveying unit is to make a turn:
  determining that the automatic conveying unit is to continuously make a plurality of turns;
  wherein the at least one processor is configured to configure the unit grid for making the turn of the automatic conveying unit in the following manner:
  configuring a plurality of unit grids in a direction of the plurality of turns of the automatic conveying unit to be unit grids for making the turns; and
  controlling the automatic conveying unit to move along the arc centered on the predetermined point so that the automatic conveying unit completes the plurality of turns by passing through the plurality of unit grids.

11. The automatic sorting system of claim 6, wherein the field comprises a high-speed motion region and a low-speed motion region; and
  wherein the at least one processor is configured to determine, in the following manner, that the automatic conveying unit is to make a turn:
  determining whether the automatic conveying unit is to enter the low-speed motion region from the high-speed motion region; and
  in response to determining that the automatic conveying unit is to enter the low-speed motion region from the high-speed motion region, determining that the automatic conveying unit is to make the turn.

12. The automatic sorting system of claim 11, wherein the low-speed motion region is a delivery channel for dropping a to-be-sorted item in an automatic sorting system.

13. A motion control method for an automatic conveying unit that moves within a field comprising a plurality of unit grids, comprising:
  determining that the automatic conveying unit is to make a turn;
  configuring a second unit grid in front of a first unit grid where the automatic conveying unit is located to be an unit grid for making the turn; and
  controlling the automatic conveying unit to move along an arc centered on a predetermined point so that the automatic conveying unit completes the turn when moving through the second unit grid to a third unit grid adjacent to the second unit grid in a direction of the turn;
  wherein the predetermined point is an intersection of the first unit grid, the second unit grid and the third unit grid;
  a radius of the arc is one-half of a side length of the unit grid; and
  the automatic conveying unit starts to move in the arc when moving to a boundary between the first unit grid and the second unit grid;
  wherein before the configuring the second unit grid to be the unit grid for making the turn:
  determining whether the second unit grid is requested by other automatic conveying units; and
  in response to determining that the second unit grid is not requested by the other automatic conveying units, forbidding the other automatic conveying units from entering the second unit grid.

14. The motion control method of claim 13, wherein the determining that the automatic conveying unit is to make the turn comprises:
  determining that the automatic conveying unit is to continuously make a plurality of turns;
  wherein configuring the unit grid for making the turn of the automatic conveying unit comprises:
  configuring a plurality of unit grids in a direction of the plurality of turns of the automatic conveying unit to be unit grids for making the turns; and
  controlling the automatic conveying unit to move along the arc centered on the predetermined point so that the automatic conveying unit completes the plurality of turns by passing through the plurality of unit grids.

15. The motion control method of claim 13, wherein the field comprises a high-speed motion region and a low-speed motion region; and
  wherein the determining that the automatic conveying unit is to make the turn comprises:
  determining whether the automatic conveying unit is to enter the low-speed motion region from the high-speed motion region; and
  in response to determining that the automatic conveying unit is to enter the low-speed motion region from the high-speed motion region, determining that the automatic conveying unit is to make the turn.

16. The motion control method of claim 13, wherein the low-speed motion region is a delivery channel for dropping a to-be-sorted item in an automatic sorting system.

* * * * *